United States Patent [19]
Wical

[11] Patent Number: 5,887,120
[45] Date of Patent: Mar. 23, 1999

US005887120A

[54] METHOD AND APPARATUS FOR DETERMINING THEME FOR DISCOURSE

[75] Inventor: Kelly Wical, Redwood Shores, Calif.

[73] Assignee: Oracle Corporation, Redwood Shores, Calif.

[21] Appl. No.: 455,484

[22] Filed: May 31, 1995

[51] Int. Cl.[6] .............................. G06F 15/00; G06G 7/00
[52] U.S. Cl. ......................... 395/10; 395/759; 395/760; 395/60; 364/419.07; 364/419.08
[58] Field of Search ............................. 395/60, 759, 760, 395/54, 10; 364/419.07, 419.08

[56] References Cited

U.S. PATENT DOCUMENTS 5,371,807  12/1994  Register et al. .......................... 382/14
5,497,319  3/1996  Chong et al. ...................... 364/419.02

*Primary Examiner*—Tariq R. Hafiz
*Assistant Examiner*—Jason W. Rhodes
*Attorney, Agent, or Firm*—Fliesler, Dubb, Meyer & Lovejoy LLP

[57] ABSTRACT

A content processing system determines content of input discourse. The content processing system includes a theme vector processor that determines themes in the input discourse. The theme vector processor identifies themes, including identifying the relative importance of the themes in the input discourse by generating a theme strength. The theme strength indicates relative thematic importance for the theme in the input discourse. A knowledge catalog, which includes static ontologies arranged in a hierarchical structure, is also disclosed. The static ontologies are independent and parallel of each other, and contain knowledge concepts to represent a world view of knowledge. The theme vector processor utilizes the static ontologies to generate a theme concept for each theme by extracting a knowledge concept from a higher level node in the hierarchical structure of a static ontology.

4 Claims, 9 Drawing Sheets

METHOD AND APPARATUS FOR DETERMINING THEME FOR DISCOURSE

MICROFICHE APPENDICES

Appendix F, entitled "Theme Parser Code" contains five microfiche with a total number of two hundred and eighty two (282) frames.

Appendix G, entitled "Code Heading" contains two microfiche with a total number of eighty five (85) frames.

Appendix I, entitled "Theme Vector Code" contains one microfiche with a total number of sixty three (63) frames.

COPYRIGHT NOTICE

Appendices F, G, and I contain material which is subject to copyright protection. The copyright owner has no objection to the facsimile reproduction by any one of the Appendix F as it appears in the United States Patent and Trademark patent files or records, but otherwise reserves all copyright rights whatsoever.

FIELD OF THE INVENTION

The present invention relates to the field of computational linguistics, and more particularly to determining and classifying theme for an input discourse.

BACKGROUND OF THE INVENTION

Discourse from a general standpoint is the capacity of orderly thought or procedure. In conversation, it is the orderly flow of ideas wherein certain topics are introduced and grouped in organized manners, and additional information expands on these topics by saying something about them. One example of a discourse is a book wherein the lowest level of a topic exists in sentences. Generally, a sentence is a grammatically self-contained language unit consisting of a word or a syntactically related group of words that express an assertion, a question, a command, a wish, or an exclamation; that in writing usually begins with a capital letter and concludes with appropriate ending punctuation; and that in speaking is phonetically distinguished by various patterns of stress, pitch and pause. Each sentence in a discourse can be said to have a topic, explicitly stated or implied, and a focus, or something that is being said about the topic.

In general, theme identifies which topic is really being discussed and what is being said about that topic. To understand the thematic information in a sentence, an analysis method is needed that is able to experience all of the subtle nuances that a writer conveys to a reader in less tangible ways. The human mind does not understand information by analyzing the grammatical content of a sentence. Many sentences are identical in grammatical context but are very different because of the specific selection of words and what additional facets of understanding the words add to the understanding of the sentence. The difference does not just influence the topics by introducing another different idea, but also influences the level of importance that each word has in the sentence by indicating new, extra-grammatical, thematic contexts. Therefore, prior art systems that determine the importance of theme by counting the number of times words appear in a document do not accurately determine theme.

SUMMARY OF THE INVENTION

A theme vector processor determines themes in an input discourse. The theme vector processor receives thematic tags for words and phrases in the input discourse, wherein the thematic tags indicate applicability of thematic constructions that define content of discourse. In addition, theme terms are identified based on the content carrying words of the input discourse. The theme vector processor identifies themes of the input discourse, including identifying the relative importance of the themes in the input discourse, based on the thematic tags and the theme terms. Specifically, the theme vector processor generates a theme strength for the theme terms. The theme strength indicates relative thematic importance for the theme terms in the input discourse.

In one embodiment, the theme vector processor generates theme concepts for each theme term in the input discourse through use of a knowledge catalog. The knowledge catalog includes independent and parallel static ontologies arranged in a hierarchical structure. The static ontologies contain knowledge concepts and present a world view of knowledge. The theme vector processor utilizes the static ontologies to generate a theme concept for a theme term by extracting a knowledge concept from a higher level node in the hierarchical structure of the static ontologies.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

DETAILED DESCRIPTION

Knowledge Catalog Overview

A knowledge catalog of the present invention provides a unique infrastructure to accurately represent concepts that define knowledge. The knowledge catalog includes a set of static ontologies to define knowledge. The knowledge catalog may be characterized as including several static ontologies because the knowledge catalog provides multiple views, characterizations, and organizations of concepts. As is explained below, the knowledge catalog contains a broad coverage of concepts to provide a world view of knowledge. The static ontologies are configured as hierarchical structures such that knowledge concepts are organized from high level generalized concepts down to more specific concepts. The static ontologies are parallel and independent of each other.

Figure 1A:
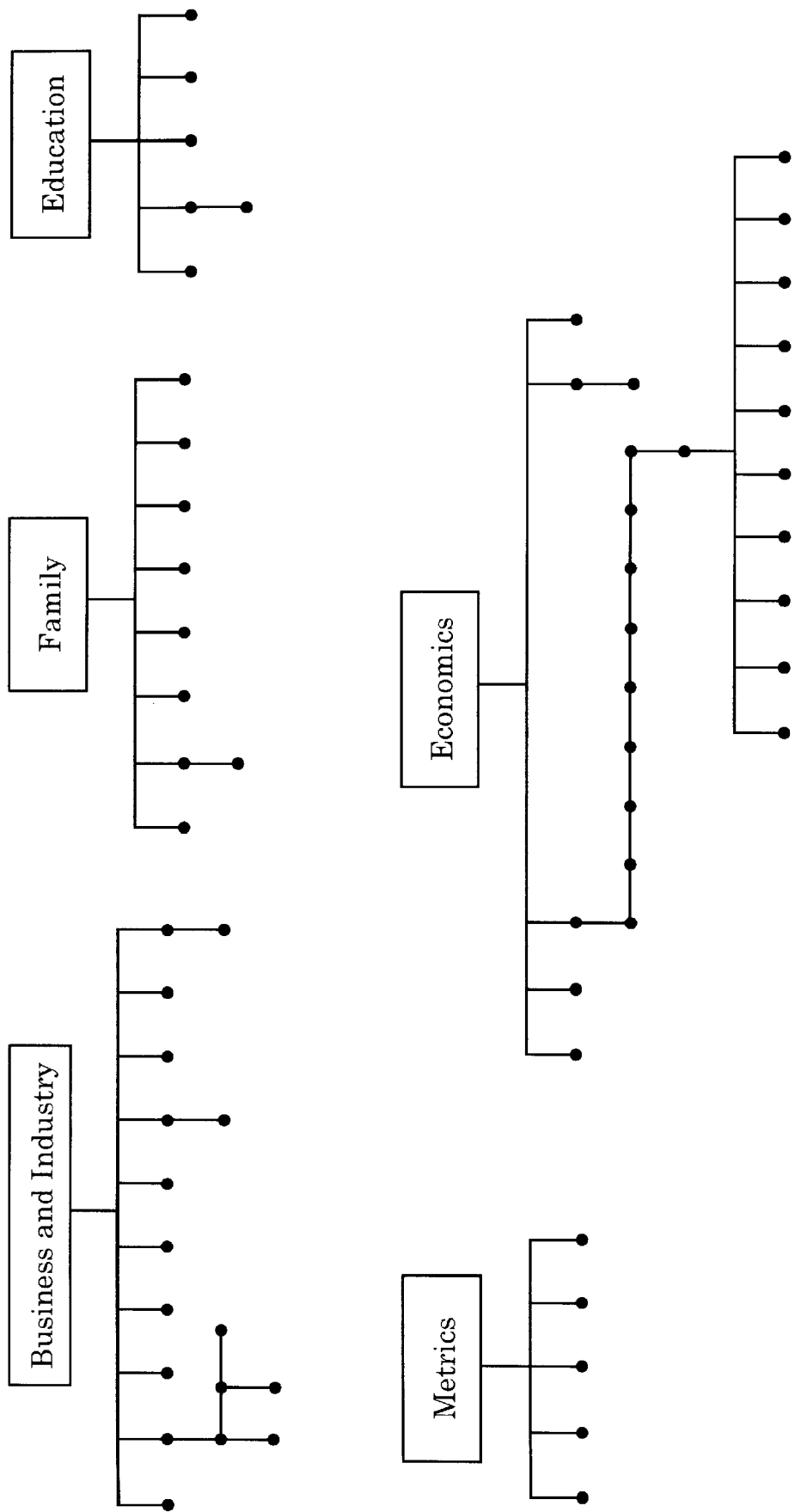
FIG. 1a illustrates several example static ontologies.

FIG. 1a illustrates several example static ontologies configured in accordance with one embodiment of the present invention. Specifically, FIG. 1a illustrates hierarchical structures for the "business and industry", "family", "education", "metrics", and "economics" static ontologies. As shown in FIG. 1a, each static ontology contains a plurality of concepts, illustrated as nodes in the hierarchical structures for the respective static ontologies. For purposes of simplicity, the specific "concepts" are illustrated only as nodes.

Each ontology shown in FIG. 1a contains a plurality of levels that form the hierarchical structure. For example, the "business and industry" static ontology contains three levels of concept classifications under the highest level concept, and the "economics" contain four levels of concept classifications. Generally, the static ontologies of the present invention includes no more than six levels.

The actual configuration, structure and orientation of a particular ontology is dependent upon the subject matter or field of the ontology. Therefore, each ontology in the set of static ontologies of the present invention contain a different point of view. The different points of view for the static ontologies result in different approaches or different ways of viewing the knowledge concepts in the different static ontologies. Consequently, the organization of the knowledge concepts in each ontology is not consistent. As is explained below, the different points of view for the ontologies permit combining "like" forms of knowledge with "unlike" forms of knowledge through linking of one or more static ontologies.

Although the set of static ontologies are broad to cover a wide range of concepts, they are not extremely detailed. In addition, the set of static ontologies do not contain concepts that are extremely volatile. For an example ontology, a classification for "computers", may contain a sub classification for "operating systems." However, particular types of operating systems, such as "Windows" and "OS/2", are too volatile, and therefore would not be contained in the example computer ontology. Because the static ontologies define a broad range of concepts but not in great detail, they remain relatively stable over time. Therefore, the static ontologies do not require frequent updates.

The ontologies contained within the knowledge catalog of the present invention are organized such that the concepts are independent of language and culture. Therefore, the set of static ontologies in the knowledge catalog of the present invention provide a world view of knowledge. The knowledge concepts in the static ontologies are applicable to all cultures and languages. For example, in the "business and industry" ontology, the concept "commerce and trade" is a sub classification of the top level "business and industry" concept. Under the concept "commerce and trade", the ontology includes the concepts "marketing", "retail trade industry", and "wholesale trade industry." For this example, all cultures engaging in commerce and trade have concepts in marketing, retail trade industry, and wholesale trade industry. Although different words in different languages are used to describe the concepts of "marketing", "retail trade industry", and "wholesale trade industry", these concepts exist in all cultures. Therefore, the "business and industry" ontology, similar to all of the static ontologies, is not dependent on language or culture.

The "business and industry" ontology hierarchy shown in FIG. 1a contains three levels of concepts in the hierarchical structure. With only three levels, the "business and industry" ontology does not contain too much detail by including low level concepts or words that are specific to the business and industry field. For example, an additional category for "Wallmart" may be desired to more specifically classify knowledge beyond the concept of "convenience stores." However, the concept of "Wallmart" is too detailed for the business and industry static ontology because "Wallmart" does not translate across cultures and languages. For this example, in order to classify "Wallmart", the concept is placed in a dynamic level as is explained below.

The static ontologies in the knowledge catalog are in essence a new type of book. For example, a thesaurus provides words with their linguistic connotations. However, a thesaurus does not provide real world culturally independent knowledge concepts, including both semantic and linguistic derivatives of the knowledge concepts. Similarly, a dictionary, which provides definitions and origins of words, does not provide such an organization of knowledge concepts. Also, an encyclopedia, which provides detailed information on a variety of subject matters, does not provide a world view of knowledge as the knowledge catalog of the present invention.

Figure 1B:
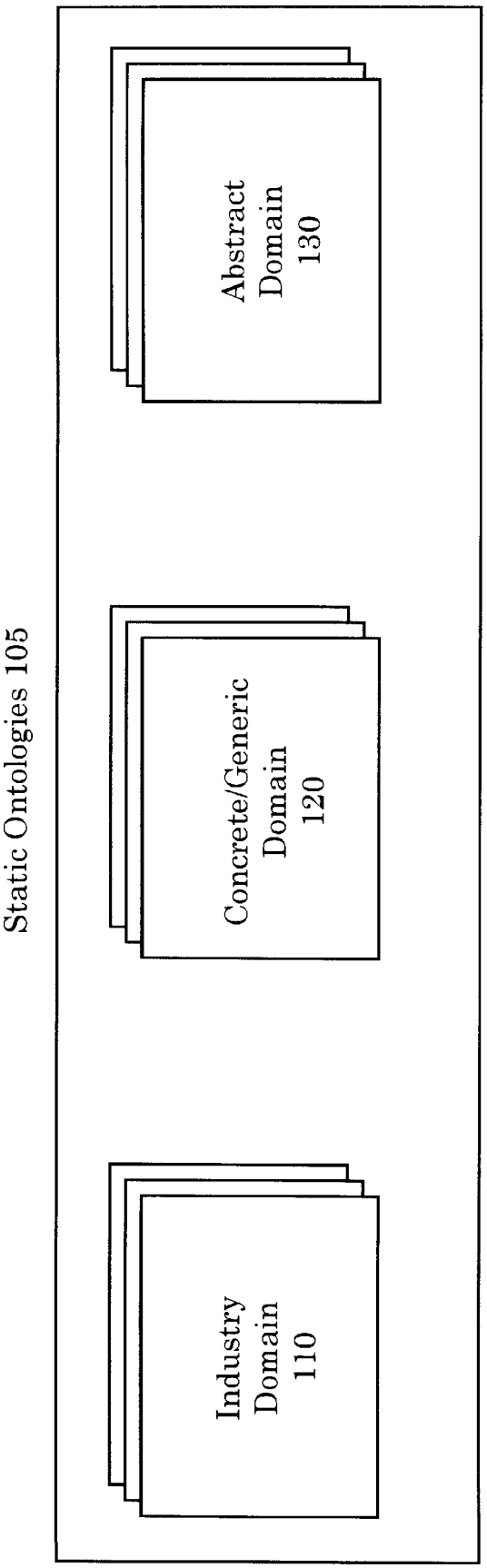
FIG. 1b illustrates a high level conceptualization for a set of static ontologies.

A high level conceptualization for a set of static ontologies are shown in FIG. 1b. For this embodiment, a set of static ontologies 105 are organized in an industry domain 110, a concrete/generic domain 120, and an abstract domain 130. The industry domain 110 includes a plurality of the static ontologies to represent words that define concrete terminology specific to one or more industries or fields of study. There are different types of industry domain 110 ontologies. For example, a classification for "electronics" includes sub-classifications for "computers" and "micro electronics." Other classifications, such as "geography", are separated into two high level classifications, "political" and "physical" geography. The industry domain 110 separates the political and physical geography classifications because the concepts of political and physical geography are very different, and each classification includes different sub-classifications beneath them.

Some of the set ontologies in the industry domain 110 are not as much industries but rather concrete concepts. For example, "clothing" represents a specific concrete ontology. In the hierarchical structure, some sub-classifications provide factual information for the higher level or parent classification, while other sub-classifications provide more richness to the parent classification. For example, the term "computer program" provides more richness to the parent classification "computer industry." However the term "California avocados" provides factual information for the parent classification "avocados" by representing that the avocados are from California.

As shown in FIG. 1b, for the preferred embodiment, the static ontologies 105 further include the concrete/generic domain 120 and abstract domain 130. The concrete/generic domain 120 contains static ontologies to represent knowledge concepts that have concrete definitions, but may be applicable to one or more specific industries or categories (e.g. the terms are generic). For example, the word "plant", when used to describe a manufacturing plant, is a concrete term that applies to many industries. Therefore, a classification for "plant" is located in the concrete/generic domain 120. The abstract domain 130 contains representations of words that are not concrete, but rather describe abstract concepts. For example, the concepts of "knowledge" and "methods" do not describe material items, but are "abstract" concepts. Although the present invention is described in conjunction with a specific domains (e.g. industry, concrete/ generic, and abstract domains), other organizations may be used to define the static ontologies without deviating from the spirit and scope of the invention.

The static ontologies of the present invention are relational such that the linking of one or more static ontologies, or portions thereof, result in a very detailed organization of knowledge concepts. As described above, each static ontology provides a high level view of a particular subject; however, linking or cross referencing among two or more static ontologies results in many combinations of knowledge hierarchical structures. For example, for the static ontologies shown in FIG. 1a, if a particular classification included concepts in "business and industry" and "economics", then the combination of the "business and industry" and "economics" ontologies provides seven hierarchical levels for that classification. Therefore, the parallel and independent nature of static ontologies, when linked or cross referenced, provides an extremely detailed and comprehensive coverage of knowledge concepts. In order to provide a complete classification hierarchy without cross referencing the independent and parallel ontologies of the present invention, it would require developing a hierarchy that anticipated every combination of knowledge concepts. As can be realized, if this approach is taken for each subject, then setting forth every conceivable breakdown becomes impossible. The groupings of independent and parallel ontologies provide a relational knowledge catalog.

The parallel and independent ontologies of the present invention allow for the greatest amount of flexibility in developing a detailed classification breakdown. For example, a first ontology may include a concept for "geography", and a second ontology may include a concept for "computers." Geography and computers are very different topics, and seemingly unrelated. The "geography" and the "computers" concepts are located in different ontologies due to the very different nature of the subject matter. However, the cross referencing of the "geography" and the "computers" ontologies permits linking the two different subject matters. For example, for the document classification application, a document may be about how different computers are used in different geographical areas.

The hierarchically structured concepts contained within the static ontologies may be semantic derivatives and/or linguistic derivatives of the high level concept. For example, a classification hierarchy may associate a "house" with articles placed within a house, such as dining room tables, chairs, bedroom furniture, etc. For this example, a classification hierarchy that includes semantic derivative concepts based on the "house" concept is desirable. However, for a purely linguistic classification hierarchy, the house "concept" may include types of houses, such as a ranch style house, a contemporary house, etc. The knowledge catalog of the present invention provides the framework or structure to generate hierarchical classifications including both semantic derivatives and/or linguistic derivatives of high level concepts. Utilizing the static ontologies of the present invention, a knowledge map may be generated that links both concepts representing articles placed within a house and concepts representing types of houses to the higher level "house" concept. Consequently, the flexibility provided by the structure of the knowledge catalog permits generation of a true knowledge map.

Content Processing System

Figure 2:
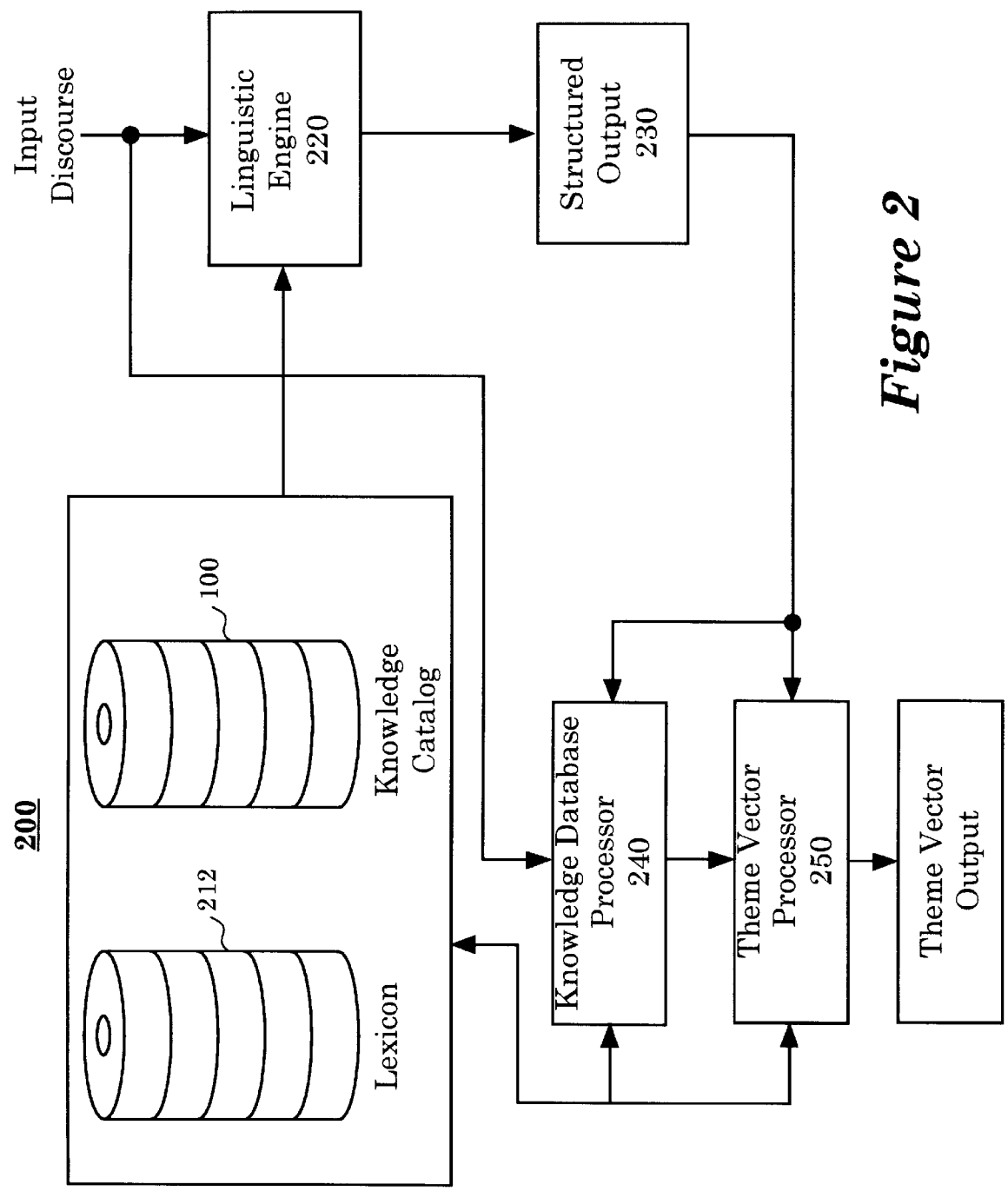
FIG. 2 is a block diagram illustrating a content processing system for input discourse.

FIG. 2 is a block diagram illustrating a content processing system of the present invention. In general, a content processing system 200 receives input discourse, and generates, as output, a theme vector. The content processing system 200 contains a morphology section 210 coupled to a linguistic engine 220. The linguistic engine 220 receives the input discourse for processing. In general, the linguistic engine 220 processes the input discourse by analyzing the grammatical or contextual aspects, as well as the stylistic and thematic attributes of the input discourse. Specifically, the linguistic engine 220 generates contextual, thematic, and stylistic tags that characterize the input discourse. As shown in FIG. 2, the linguistic engine 220 generates a structured output 230 containing, in part, the contextual, thematic, and stylistic tags. Furthermore, the linguistic engine 220 extracts the topic and content for each sentence in the input discourse.

The morphology 210 includes a lexicon 212 and the knowledge catalog 100 of the present invention. In general, the lexicon 212 contains definitional characteristics for a plurality of words and terms. For example, the lexicon 212 defines whether a particular word is a noun, a verb, an adjective, etc. The linguistic engine 220 utilizes the definitional characteristics stored in the lexicon 212 to generate the contextual, thematic, and stylistic tags in the structured output 230. The generation of thematic tags is described more fully below.

The content processing system 200 further includes a knowledge catalog processor 240 and a theme vector processor 250. As shown in FIG. 2, the knowledge catalog processor 240 and the theme vector processor 250 are coupled to the lexicon 212 and knowledge catalog 100. In general, the knowledge catalog processor 240 receives, as inputs, the structured output 230 including the extracted content, the knowledge catalog 100, and the lexicon 212, and processes the extracted content for use with the knowledge catalog 100. The theme vector processor 250 receives, as inputs, the structured output 230, the processed output from the knowledge catalog processor 240, the knowledge catalog 100, and the lexicon 212. The theme vector processor 250, in accordance with the present invention, identifies the most important themes in the input discourse, and maps these themes into the knowledge catalog 100.

As described above, the knowledge catalog 100 describes all senses for a particular word or term. In a preferred embodiment, the content and topic of sentences is extracted in the linguistic engine 220, and is input to the knowledge catalog processor 240 in the form of content carrying words. The content processing system 200 only operates on the content carrying words for which the sense has been determined with a large degree of certainty (e.g. the non ambiguous content carrying words). After determining the sense of content carrying words, the content processing system 200 determines the expressions of content for the input discourse.

The content processing system 200 may be implemented in either hardware or software. For the software implementation, the content processing system 200 is software that includes a plurality of computer executable instructions for implementation on a general purpose computer system. Prior to loading into a general purpose computer system, the content processing system software may reside as encoded information on a computer readable medium, such as a magnetic floppy disk, magnetic tape, or compact disc read only memory (CD-ROM). In one hardware implementation, the linguistic engine 220, the knowledge catalog processor 240 and the theme vector processor 250 may each comprise dedicated processors including processor instructions for performing the functions described herein. Circuits may also be developed to perform the functions described herein. The lexicon 212 and the knowledge catalog 100 may be implemented as databases stored in memory for use by the content processing system 200.

Figure 3:
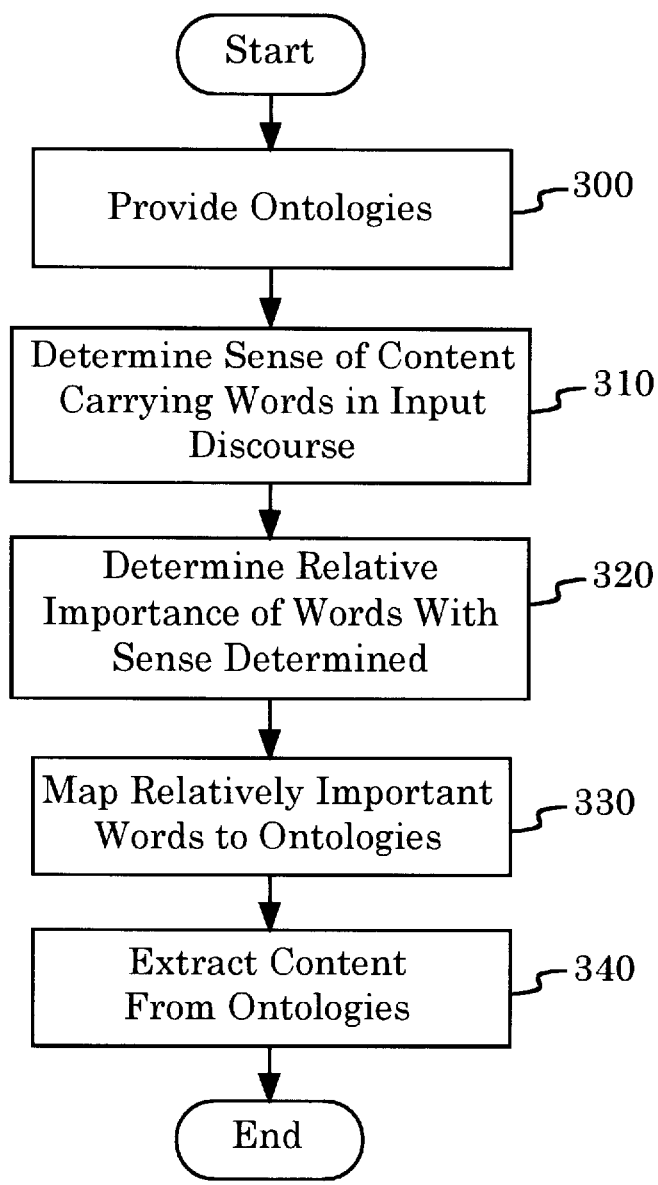
FIG. 3 is a flow diagram illustrating the high level methodology for content processing.

FIG. 3 is a flow diagram illustrating the high level methodology for content processing. The ontologies, such as the static ontologies 105, are provided as shown in block 300. As shown in block 310, the sense of content carrying words in the input discourse are determined. For all words in which the sense has been determined, the relative importance of these words, with respect to each other, are determined as shown in block 320. Based on the relative importance, the words are mapped to the static ontologies to reflect the general concepts disclosed in the input discourse as shown in block 330. By utilizing the static ontologies, content classification is determined as shown in block 350.

In general, the concepts mapped to the static ontologies capture the overall world view content classification of the input discourse. However, through discourse of a document, a combination of the abstract expressions of the knowledge base elements represent the actual content of the particular document. Therefore, the concepts from the static ontologies are an abstract representation of input discourse themes in time. The combination of these themes in time represent the actual content of the input discourse.

The knowledge catalog processor 240 processes content carrying words for use by the theme vector processor 250. Specifically, the knowledge catalog processor 240 generates the noun or nominal forms of the content carrying words in the input discourse. The knowledge catalog processor 240 parses the knowledge catalog 100 to compare the content carrying words with the knowledge concepts stored in the static ontologies. If the content carrying word is not contained in at least one domain in the static ontologies, then the word is noted as being not yet understood. If the word is stored more than once in the static ontologies, then the word is classified as ambiguous. If the word is stored only once in the static ontologies, then the word is classified as non ambiguous. If a word is classified as non ambiguous, then the theme vector processor 250 determines the concept of the word from the static ontologies. In a preferred embodiment, a minimum of 50% of the content carrying words must be recognized as non ambiguous.

As discussed above, the knowledge catalog processor 240 generates noun and nominal forms of content carrying words for look-up in the knowledge catalog 100. In order to accomplish this, the knowledge catalog processor 240 reads structured output 230 to determine which words are the content carrying words. The contextual tags determine whether a word carries content. For example, the word "will" could be an auxiliary verb or it could be a noun (e.g. a legal term). As an auxiliary verb, the word "will" carries no content. Using the content carrying words, the knowledge catalog processor 240 separates nouns and non nouns. The non noun content carrying words, such as adjectives, adverbs, and verbs, etc., are converted into nouns or nominal forms. For example, the verb "to fish" is converted to "fishing." The content carrying nouns are further analyzed to determine whether the word has a mass sense and/or a count sense. For example, the word "baseball", which is the mass sense of the word, has a completely different meaning than the count sense "baseballs."

In the preferred embodiment, because the noun sense of a word may be different from the nominal sense, and the mass sense may be different from the count sense, a separate classification or tree attachment exists for nominal and noun forms as well as for mass and count senses. Therefore, the knowledge catalog 100 stores all possible senses of a content carrying word. For example, the noun "a fish" has a different meaning than the verb "fishing" which was nominalized to "to fish." Based upon the above criteria, every content carrying word contains up to four potential pointers into one or more categories in the static ontologies 105. Specifically, each content carrying word may contain a pointer to the static ontologies 105 for the noun form, the nominal form, the mass sense, and the count sense.

In addition to nouns and regular content carrying words discussed above, words in the input discourse may also be characterized as special words. These special words include orienters and global classifiers. Orienter words guide the reader to a field of study regardless of the use of the word. A global classifier word carries the essence of a particular category, wherein the category may include sub categories beneath the category defined by the global classifier. In generating the pointers to the static ontologies, if there is not a concept for the nominal, then the concept of the noun is attached to the concept of the nominal. The special words may be mapped directly into the static ontologies.

After the sense of a majority of the content carrying words has been determined, the content processing system 200 maps key content carrying words into the static ontologies 105. In order to accomplish this, the theme vector processor 250 determines the relative importance of content carrying words in relationship to other content carrying words. The most important content carrying words are mapped to the knowledge catalog elements in the static ontologies 105.

Figure 4:
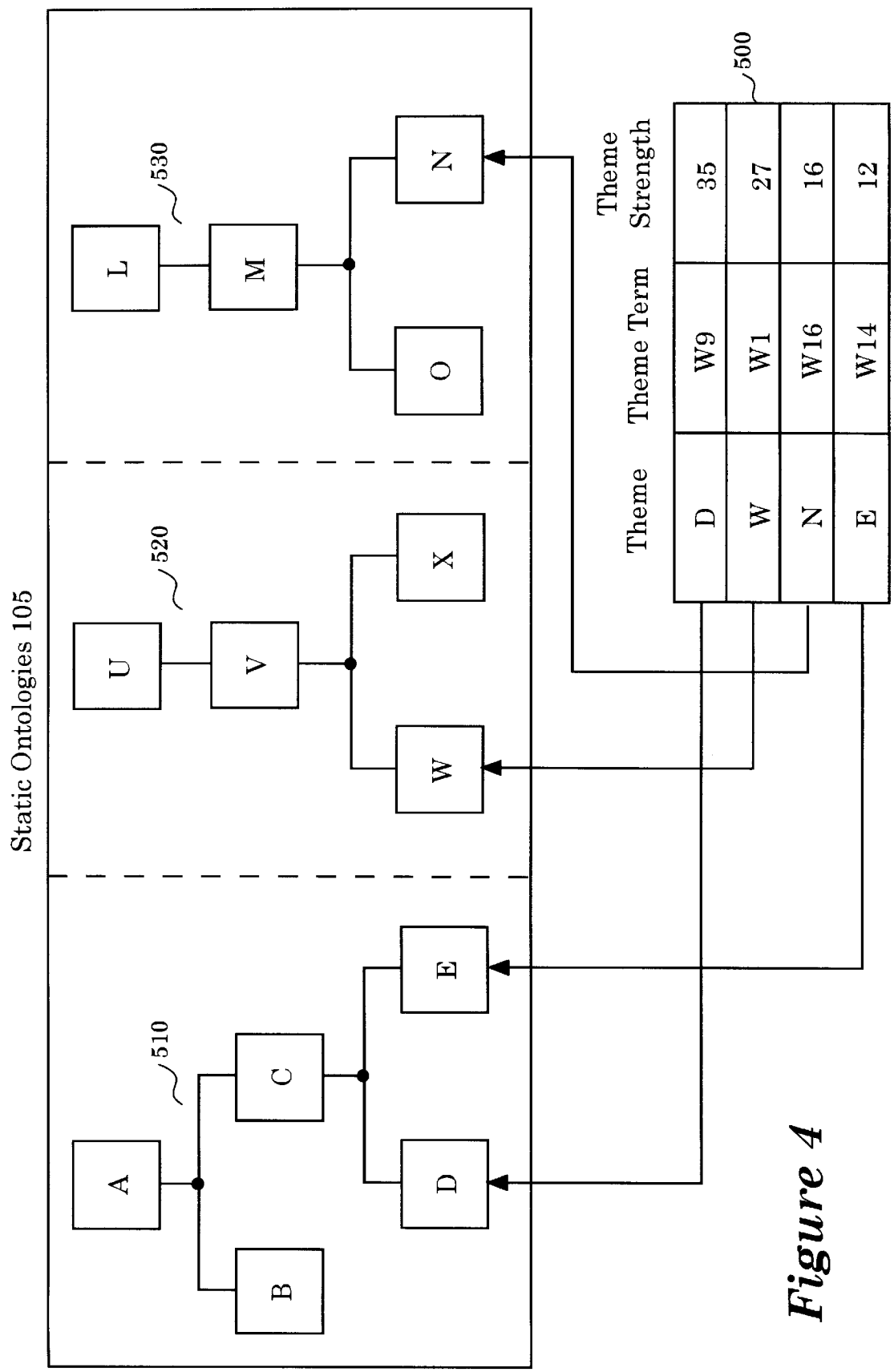
FIG. 4 conceptually illustrates an example of theme vector processing.

FIG. 4 conceptually illustrates an example of theme vector processing of the present invention. For purposes of explanation, the static ontologies 105 of the knowledge catalog 100 are shown as having three classification hierarchies 510, 520 and 530. Specifically, the database element "A" represents the highest level for the classification hierarchy 510, and the database element "B" and "C" are sub classifications of "A." Also, the classification hierarchy 510 includes sub classifications "D" and "E" linked to the database element "C." Furthermore, as shown in FIG. 4, the classification hierarchies 520 and 530 contain the database elements "U" and "L", respectively, as the high level classifications.

The theme vector processor 250 receives, as an input, the structured output 230 that contains contextual and thematic tags. In addition, the theme vector processor 250 receives the definitional characteristics from the lexicon 212. With this information, the theme vector processor 250 executes a plurality of heuristic routines to generate the relative importance of content carrying words in the input discourse. The theme vector processor 250 only operates on non ambiguous content carrying words or on ambiguous words that have been disambiguated. In a preferred embodiment, the theme vector processor 250 generates a theme strength based on the output of the heuristic routines. The theme strength of a particular content carrying word is then used in conjunction with the theme strength of another word to generate a ratio of relative thematic importance between all words.

A theme vector output, labeled 500 in FIG. 4, illustrates several relative theme strengths for a number of words in an example input discourse. As shown in FIG. 4, the ninth word "W9" received a relative strength of 35, and the first word "W1" received a relative strength of 27. Therefore, "W9" has a relative thematic importance of 35/27 in relationship to "W1."

The theme vector processor 250 links the most important content carrying words into the static ontologies 105. As discussed above, the theme vector processor 250 only operates on non ambiguous content carrying words. Therefore, the content carrying words are directly mapped into the knowledge concepts of the static ontologies 105. For the example shown in FIG. 4, the most important word, "W9", has the "D" concept, and therefore is mapped to the "D" knowledge concept in the static ontologies 105. Note that for this example, the three most important words tie into the static ontologies in three separate classification hierarchies. Accordingly, the theme vector processor 250 determines that the three most important concepts in the input discourse are "D", "W", and "N."

In a preferred embodiment, the theme vector processor 250 uses the sixteen most important words of each sentence to map the concepts into the static ontologies 105. If the input discourse consists of a single paragraph, the sixteen concepts are more than enough to capture the overall content of the document. For a larger document consisting of many paragraphs, the sixteen most important concepts captures the overall content, and extending beyond the sixteen concepts typically only reinforces the high level concepts that were deemed most important.

Theme Parsing Overview:

As discussed above, the theme vector processor 250 utilizes the contextual tags stored in the structures output 230. In one embodiment, the linguistic engine 220 generates the contextual tags via a chaos loop process. All words in a text have varying degrees of importance in the text, some carrying grammatical information, and others carrying the meaning and content of the text. In general, the chaos loop process identifies, for words and phrases in the input discourse, grammatical aspects of the input discourse including identifying the various parts of the speech. In order to accomplish this, the chaos loop process ascertains how the words, clauses and phrases in a sentence relate to each other. By identifying the various parts of speech for words, clauses, and phrases for each sentence in the input discourse, the context of the input discourse is defined. The chaos loop process stores information in the form of the contextual tags.

The theme vector processor 250 also utilizes the thematic tags stored in the structures output 230. Each word carries thematic information that conveys the importance of the meaning and content of the input discourse. In general, the thematic tags identify thematic context of the input discourse. In general, the thematic tags identify thematic context of the input discourse, such as text. Each word is discriminated in the text, identifying the type of importance or meaning, the impact on different parts of the text, and the overall contribution to the content of the text. The thematic context of the text is determined in accordance with predetermined theme assessment criteria that is a function of the strategic importance of the discriminated words. The predetermined thematic assessment criteria define which of the discriminated words are to be selected for each thematic analysis unit. The text is then output in a predetermined thematic format.

In addition to the grammatical tags and thematic tags, the structured output 230 also includes outputs for extracted topics, kernel sentences, and extracted content. The knowledge catalog processor 240 utilizes these output areas to generate the content carrying words found in the input discourse. The linguistic engine 220 further includes a topic extractor, that gives the topics of the text, a kernel generator, that generates summarized versions of the text, and a content extractor that identifies key content of the text. Appendix F contains a source code listing for implementing the Text Theme Parser. Appendix G contains a list of defined source code headers corresponding to the theme parser source code of Appendix F.

Figure 5:
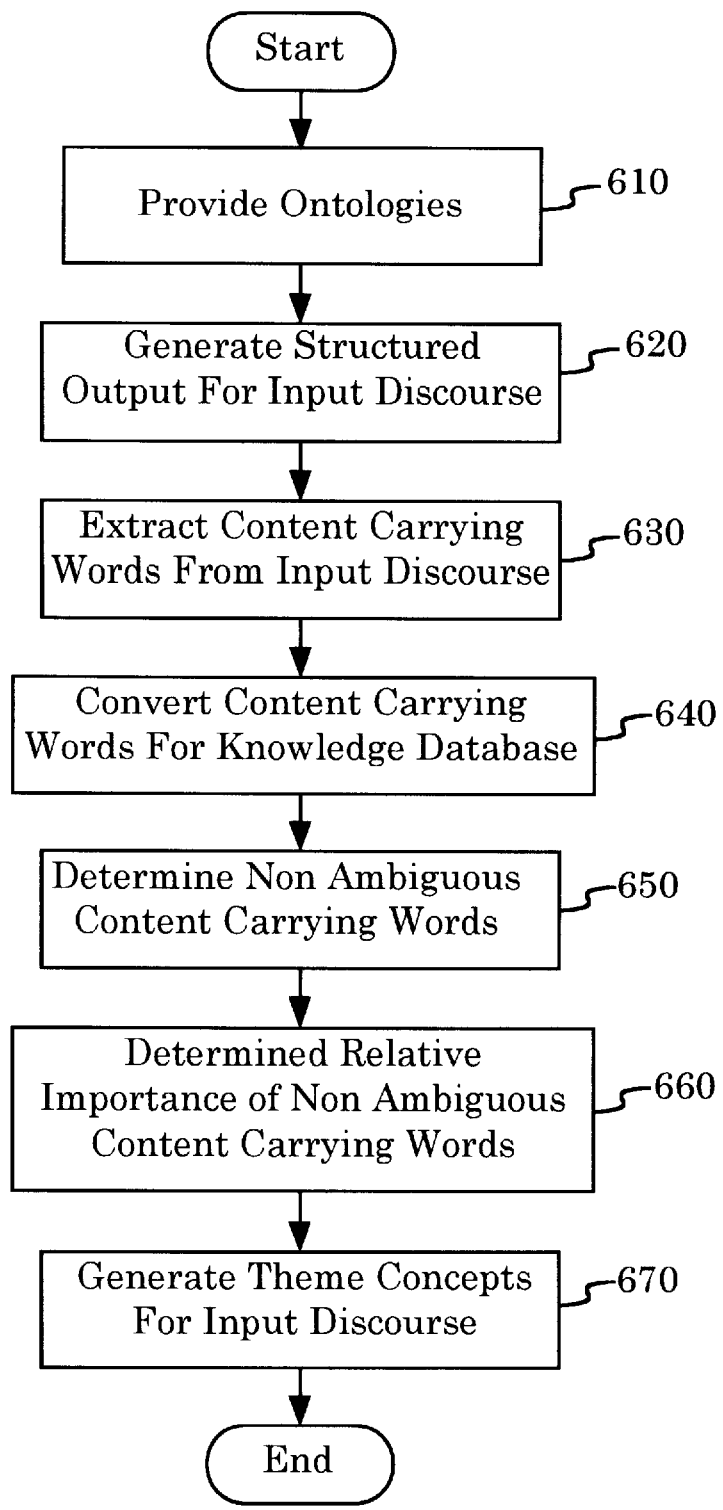
FIG. 5 illustrates a high level methodology for content processing including theme vector processing.

Theme Vector Processing:

FIG. 5 illustrates a high level methodology for content processing including theme vector processing. The high level methodology illustrated in FIG. 5 is described in conjunction with the content processing system 200 shown in FIG. 2. The steps for the high level methodology disclosed in FIG. 5 were discussed above, however, FIG. 5 provides an overview of the content processing flow of the present invention. As shown in block 610, the ontologies that form the world view of knowledge are stored in the knowledge catalog 100. The input discourse is processed in the linguistic engine 220 to generate the structured output 230. Specifically, the linguistic engine 220 generates a plurality of thematic tags and contextual tags for the input discourse as shown in block 620. Also, the linguistic engine 220 extracts content carrying words from the input discourse by utilizing the thematic tags as shown in block 630.

The content carrying words from the linguistic engine 220 are input to the knowledge catalog processor 240. In part, the knowledge catalog processor 240 processes the content carrying words for direct use with the knowledge catalog 100 as shown in block 640. Specifically, the knowledge catalog processor 240 generates, as appropriate, the nominal or noun form of each content carrying word, as well as the count sense and mass sense of the word. Furthermore, the knowledge catalog processor 240 determines, from the knowledge catalog 100, which content carrying words are non ambiguous as shown in block 650.

The non ambiguous content carrying words are input to the theme vector processor 250. In addition, the theme vector processor 250 receives the structured output 230. The theme vector processor 250 determines the relative importance of the non ambiguous content carrying words in the input discourse as shown in block 660. In the preferred embodiment, the theme vector processor 250 generates a list of theme terms, including words and phrases, and assigns a relative theme strength to each theme term. Furthermore, as shown in block 670 on FIG. 5, the theme vector processor 250, through use of the ontologies, generates a theme concept for each theme term. The theme concepts indicate a general topic to identify the content of the input discourse.

Figure 6:
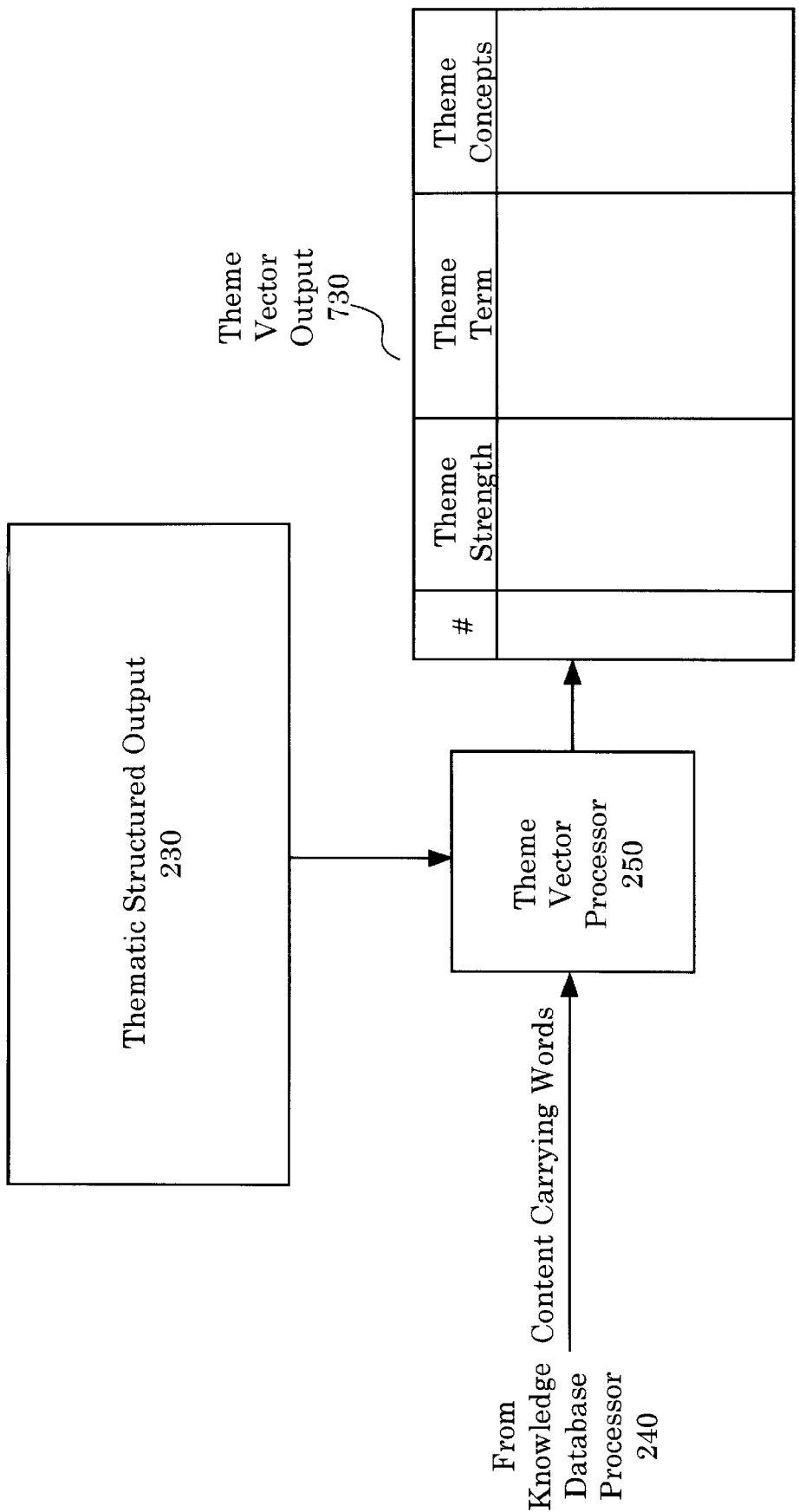
FIG. 6 is a block diagram illustrating the operational flow of theme vector processing.

FIG. 6 is a block diagram illustrating the operational flow of theme vector processing. As shown in FIG. 6, the theme vector processor 250 receives the thematic tags 710 and contextual tags 720 from the structured output 230. In addition, the theme vector 250 receives the content carrying words from the knowledge catalog processor 240. The content carrying words may include single words or phrases. Note that the content carrying words output from the knowledge catalog processor 240 are converted to the noun or nominal form. Also shown in FIG. 6, the theme vector processor 250 generates a thematic vector output 730. In a preferred embodiment, the theme vector output 730 contains, for each theme term, an importance number (#), a theme strength, a theme concept, and an overall capacity weight of collective content importance.

The theme vector output 730 presents a thematic profile of the content of input discourse (e.g. a sentence, paragraph, or document). The theme vector output 730 contains a list of nominalized words, labeled "Theme Term" in FIG. 6, that represent the major themes in the input discourse. In a preferred embodiment, the theme vector output includes up to sixteen of the most important themes for each sentence, paragraph and document. A theme term in a theme vector is typically based on an actual word or phrase that is contained in the text of the input discourse, or a nominal or plural form of a word. However, the word defining the theme concept may not appear in the input discourse. Instead, the theme concept is conceptualized from the theme term as set forth in a particular ontology stored in the knowledge catalog 100. Also, the theme concepts may become theme term entries when they are generalized.

In a preferred embodiment, each theme in the theme vector output 730 is assigned a normalized or relative theme strength. The normalized theme strength is calculated using the theme strengths of each theme term in the text that contribute to the particular theme. At the sentence level, the theme vector processor 250 calculates a theme strength for each content-carrying word in the sentence. The theme strength of the word measures the thematic weight of the word within the context of the sentence in which it appears. Prior to processing, each content carrying word receives a default theme strength that varies depending upon the word. As the theme vector processor 250 analyzes the surrounding text in the sentence to determine the thematic role of the word, it increases or decreases the theme strength for the word. For example, a theme grading determines how each word in a sentence is functioning within the context and structure of the sentence. The theme grading assigned to a word affects the theme strength for the word.

In the preferred embodiment, the theme vector processor 250 executes a plurality of heuristic routines to generate the theme strengths for each theme. Appendix I contains a complete source code listing for theme vector processing of the present invention. The following source code illustrates the generation of the theme strengths in accordance with one embodiment. The source code that follows includes detailed comments to explain the operation of the code. Although the generation of the theme strengths is disclosed as computer source code, the theme strengths may be generated by any means, such as a hardware implementation, without deviating from the spirit or scope of the invention.

```
//Accumulate the theme strengths for each word/phrase in each sentence.
//Each word/phrase is started with a zero strength.
for (x = 0; x < number_words; x++)
{
//First loop through all of the words and add the 'Orienter' strengh
//for every word that is marked as an orienter in the lexicon.
   ThemeStrength[x] = 0;
   if (LEX(wd_orienter_phrase,x))
   {
      /* ThemeOrienter */
      ThemeStrength[x] = ThemeStrength[x] +
         at4IT_IncreaseTheme(settings,CurrentParagraphNumber,
               CurrentSentenceNumber, (sb4)settings—>thmstr_atis—>Orienter_atits,
};
   }
}
for (get_level = 0; get_level < 16; get_level++)
{
  for (actual_position = 0;
         actual_position < number_words;
         actual_position++)
  {
  //Now start the main loop checking certain contexts and accumulating
  //weights accordingly.
      if (!prep[actual_position] && !LEX(wd_conj,actual_position) &&
      //Exclude words functioning as prepositions and any word that
      //is potentially a conjunction of any type.
         !prn[actual_position] &&
         // exclude all words functioning as pronouns
         !(atusTD_TestDeterminer(actual_position) &&
            word_type_code[actual_position] > DEFAULT_NB) &&
            //exclude all words that are determiners
         !LEX(wd_det_group_a,actual_position) &&
         //exclude all group a determiners
         !(adv[actual_position] &&
            LEX(wd_intensifier_adverb,actual_position)) &&
            //exclude all intensifying adverbs
         !(atxwFAC_IsWordFactive(actual_position) &&
            !apunc[actual_position] && atxwOF_IsWordOf(actual_position+1)) &&
            //exclude all factives followed by no punctuation and 'of'
         !(actual_position == 0 && !apunc[0] && adj[0] && pp_noun[1] &&
            'pos_adv[0] && !pos_prep[0] && !pos_conj[0]
            && !atusTD_TestDeterminer(0)) &&
            //exclude all first words that do not have punctuation, that
            //are not adjectives,that are followed by proper nouns,
            //that cannot possibly be adverbs, that cannot possibly
            //be prepositions, that cannot possibly by conjunctions and
            //that are not determiners.
         !(!LEX(wd_orienter_phrase,actual_position) && adv[actual_position]) &&
         //exclude all non-orienting adverbs
         !LEX(wd_pre_det,actual_position) &&
         //exclude all pre determiners
         !(LEX(wd_dual_gender,actual_position) &&
            LEX(wd_subjective_view_adverb,actual_poisition) &&
            LEX(wd_not_index_head,actual_position)) &&
```

```
        //exclude all dual gender, weak nouns that cannot function
        //as index heads.
        !(!LEX(wd_c_noun,actual_position) && cm_noun[actual_position] &&
            LEX(wd_adj,actual_position) &&
            LEX(wd_noun_promotion_adj,actual_position) &&
            LEX(wd_subjective_view_adverb,actual_position)) &&
            //exclude all weak adjectives promoted to nouns.
        !(atusCAV_CheckAuxVerb(actual_position) && verb[actual_position]) &&
        //exclude all auxillary verbs
        !atxwNUM_IsWordNumber(actualposition) &&
        //exclude all numbers
        !LEX(wd_cardinal_noun,actual_position) &&
        //exclude all cardinal nouns
        !LEX(wd_ordinal_noun,actual_position) &&
        //exclude all ordinal nouns
        ISSETL(settings—>thmctr_atis,atist_THMVEC) &&
        //make sure the settings say to run the theme vectors
        !atxwNUM_IsWordNumber(actual_position))
        //another test for numbers to exlcude
{
    if (get_level == 0 && !LEX(wd_useless_phrase,actual_position) &&
        !LEX(wd_meaningless_word_phrase,actual_position))
    {
    //if the first theme reduction level is tagged for the word and
    //if the word is not a useless phrase and if the word is
    //not a meaningless phrase then continue
        if (complete_subject[actual_position] &&
            !(!subordinate_clause[actual_position] &&
               !read_codes[actual_position][0]))
        {
        //if the word is in the complete subject and
        //a main clause with a level one reduction,
        //then it accumulates MnRx weight
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>MnRx_atis,
                        actual_position); /* 50 */
            if (!prep_phrase[actual_position])
            {
            //if the word is not in a preposition phrase, then
            //it accumulates MnRxNoPrep weight
                ThemeStrength[actual_position] = ThemeStrength[actual_position] +
                    at4IT_IncreaseTheme(settings,CurrentParagraphNumber,CurrentSentenceNumber,
                        (sb4)settings—>thmstr_atis—>MnRxNoPrep_atits,actual_position);
            }
            if (simple_subject[actual_position])
            {
            //if the word is the simple subject of the clause, then
            //it accumulates MnRxSimSubj weight
                ThemeStrength[actual_position] = ThemeStrength[actual_position] +
                    at4IT_IncreaseTheme(settings,CurrentParagraphNumber,CurrentSentenceNumber,
                        (sb4)settings—>thmstr_atis—>MnRxSimSubj_atits,actual_position);
            }
        }
        if (complete_subject[actual_position] &&
                (!weak_n_table[actual_position] ||
                 LEX(wd_orienter_phrase,actual_position)) &&
                !(!subordinate_clause[actual_position] &&
                   !read_codes[actual_position][0]))
        {
        //if the word is in the complete subject and a
        //strong content carrying word, and part of the main
        //clause and a level 1 reduction, then it accumulates
        //SubSubjStr weight
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>SubSubjStr_atits,
        }
        if (!subordinate_clause[actual_position] &&
                read_codes[actual_position][0])
        {
        //if the word is not in a subordinate clause and is part of
        //the level one reduction, then it accumulates MnNoRx weight
            ThemeStrength[actual_position] = ThemeStrength[actual_position] +
                at4IT_IncreaseTheme(settings,CurrentParagaphNumber,
                        CurrentSentenceNumber,(sb4)settings—>thmstr_atis—>MnNoRx_atits,
                        actual_position); /* 50 */
        }
        if (ThemeStrength[actual_position] == 0)
        {
```

```
        //if the word has received no theme weight at this point,
    //then it accumulates nTheme weight
        ThemeStrength[actual_position] = ThemeStrength[actual_position] +
            at4IT_IncreaseTheme(settings,CurrentParagraphNumber,
                        CurrentSentenceNumber, (sb4)settings—>thmstr_atis—>NTheme_atits,
                        actual_position); /* 5 */
    }
}
if (read_codes[actual_position][get_level] &&
        !LEX(wd_useless,phrase,actual_position) &&
        !LEX(wd_meaningless_word_phrase,actual_position))
{
//if the word is not marked with a useless or meaningless
//flag, then it is checked for the different reduction
//levels and a weight accumulated for each valid level.
//Each level is checked and accumulated through the setting
//'get_level'. These levels correspond to the levels from
//the theme parser final stage output.
    if (get_level == 0)
    {
        ThemeStrength[actual_position] = ThemeStrength[actual_position] +
            at4IT_IncreaseTheme(settings,CurrentParagraphNumber,
                        CurrentSentenceNumber, (sb4)settings—>thmstr_atis—>MnThm_atits
                        actual_position); /*10 */
    }
    if (get_level == 1)
    {
        ThemeStrength[actual_position] = ThemeStrength[actual_position] +
            at4IT_IncreaseTheme(settings,CurrentParagraphNumber,
                        CurrentSentenceNumber, (sb4)settings—>thmstr_atis—>SdThm_atits,
                        actual_position); /*15*/
    }
    if (get_level == 2)
    {
        ThemeStrength[actual_position] = ThemeStrength[actual_position] +
            at4IT_IncreaseTheme(settings,CurrentParagraphNumber,
                        CurrentSentenceNumber, (sb4)settings—>thmstr_atis—>TrdThm_atits,
                        actual_position); /*20*/
    }
    if (get_level == 3)
    {
        ThemeStrength[actual_position] = ThemeStrength[actual_position] +
            at4IT_IncreaseTheme(settings,CurrentParagraphNumber,
                        CurrentSentenceNumber, (sb4)settings—>thmstr_atis—>Context_atits,
                        actual_position); /*50*/
    }
    if (get_level == 4)
    {
        ThemeStrength[actual_position] = ThemeStrength[actual_position] +
            at4IT_IncreaseTheme(settings,CurrentParagraphNumber,
                        CurrentSentenceNumber, (sb4)settings—>thmstr_atis—>MnPhr_atits,
                        actual_position); /*60*/
    }
        ThemeStrength[actual_position] = ThemeStrength[actual_position] +
            at4IT_IncreaseTheme(settings,CurrentParagraphNumber,
                        CurrentSentenceNumber, (sb4)settings—>thmstr_atis—>NmTpcs_atits,
                        actual_position); /*50*/
    }
    if (get_level == 13)
    {
        if (!LEX(wd_pp_noun,actual_position))
        {
        //level 13 gets a specific extra weight for proper nouns
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>TpcIndA_atits,
                        actual_position); /* 200 */
        }
        ThemeStrength[actual_position] = ThemeStrength[actual_position] +
            at4IT_IncreaseTheme(settings,CurrentParagraphNumber,
                        CurrentSentenceNumber, (sb4)settings—>thmstr_atis—>TpcIndB_atits,
                        actual_position); /* 200 */
    }
    if (get_level == 14)
    {
        ThemeStrength[actual_position] = ThemeStrength[actual_position] +
            at4IT_IncreaseTheme(settings,CurrentParagraphNumber,
                        CurrentSentenceNumber, (sb4)settings—>thmstr_atis—>Definition_atits,
                        actual_position); /*80*/
    }
```

```
            if (get_level == 15)
            {
                ThemeStrength[actual_position] = ThemeStrength[actual_position] +
                    at4IT_IncreaseTheme(settings,CurrentParagraphNumber,
                            CurrentSentenceNumber, (sb4)settings—>thmstr_atis—>DevPrprNm_atits,
                            actual_position);
            }
        }
      }
    }
  }
}
//this concludes the main theme vector weight accumulation routines.
//The routines that follow add additional weights for special contexts.
        if (get_level == 5)
        {
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>MnTpc_atits,
                        actual_position); /*100*/
        }
        if (get_level == 6)
        {
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>SdTpc_atits,
                        actual_position); /*5*/
        }
        if (get_level == 7)
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>MnDevTpc_atits,
                        actual_position); /*80*/
        }
        if (get_level == 8)
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>MnPrxDevTc_atits,
                        actual_position); /*100*/
        }
        if (get_level == 9 && (!weak_n_table[actual_position] ||
                    LEX(wd_orienter_phrase,actual_position)))
        {
            //level 9 is further quailified by requiring the word
            //to be a strong content carrying word.
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>HdWrds_atits,
                        actual_position);
        }
        if (get_level == 10)
        {
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>PrprNm_atits,
                        actual_position);
        }
        if (get_level == 11)
        {
            ThemeStrength[actual_position] = ThemeStrength[actual_position] +
                at4IT_IncreaseTheme(settings,CurrentParagraphNumber,
                        CurrentSentenceNumber, (sb4)settings—>thmstr_atis—>Description_atits,
                        actual_position); /*50*/
        }
        if (get_level == 12)
        {
```

Thus, a theme vector identifies the 16 strongest themes in a sentence, paragraph or document in proportion to the sentence, paragraph or document for which the theme vector output is generated.

The theme vector processor 250 returns the concept, if one exists, for each theme term in the theme vector. Similar to the theme terms, the theme concepts in the theme vector output 730 contain a theme strength. As the theme vector processor 250 identifies themes that have the same concept in the input discourse, the theme strength for the theme concept increases. This indicates that the theme concept is significantly developed in the input discourse. As a result, the theme vector processor 250 may promote the theme concept to a separate theme in the theme vector output 730 for the corresponding input discourse. For example, if the theme vector processor 250 determines that "printing press" is one of the theme terms in a paragraph, then the theme concept "printing" is assigned to the theme term "printing press." In addition, the theme vector processor 250 assigns a theme strength to the theme concept. The theme vector processor 250 increases the theme strength for "printing" if the paragraph contains other words such as "bold face" and "typesetting", that conceptualize to "printing." The theme concept "printing" may then appear as a theme term for the paragraph, along with its own theme concept, "publishing industry." In a preferred embodiment, the theme vector processor 250 includes input adjustments (not shown) to prevent promoting theme concepts in a theme vector output 730 to additional theme terms.

In addition to providing a theme strength for each theme term, the theme vector processor 250 calculates a theme capacity. In general, the theme capacity provides a quantitative measurement of the thematic weight or content of a sentence, paragraph, or document relative to other sentences, paragraphs, and documents with similar themes. For example, if two paragraphs discuss the prime interest rate for banks, then the theme vectors for both paragraphs list prime interest rate as one of the main themes. However, the first paragraph only lists the current prime interest rate, while the second paragraph lists the current rate, provides a definition of prime interest rate, and analyzes the fluctuations in the rate over the last two years. For this example, the theme vector processor 250 assigns a higher theme capacity to the second paragraph. When comparing the paragraphs from a content standpoint, both paragraphs are about the prime interest rate. In fact, the theme strength for prime interest rate in the first paragraph may be higher than in the second paragraph. However, note that the theme strength between vectors should not be compared because theme strength only measures thematic importance within the context of the containing paragraph. However, from the standpoint from understanding prime interest rates, the second paragraph clearly provides more information. Similar to theme terms, the theme capacity in a theme vector output 730 is affected by the theme strength of the words in the sentence, paragraph, or document.

The following example illustrates a theme vector output generated by the theme vector processor 250 for input discourse, such as a paragraph. The example paragraph is from a document about commercial banks lowering interest rates based on changes to the Federal funds rate.

Treasury bill yields dropped substantially Friday morning in anticipation of further reductions in the Federal funds rate by the Fed, market watchers said. The 3-month bill fell 8 basis points to a discount equivalent rate of 7.70%, while the 1-year bill was down 12 basis points to 7.30%.

Table 1 illustrates the theme vector output for the example paragraph. As shown in Table 1, for each theme term, the theme vector output 30 includes a theme strength and a theme concept.

TABLE 1

| | | Overall Theme Capacity 79,902 | |
|---|---|---|---|
| # | Theme Strength | Theme Terms | Theme Concept |
| 1 | 43 | banking | finance and investment |
| 2 | 25 | basis points | stocks, bonds, and commodities |
| 3 | 24 | treasury bill yields | banking |
| 4 | 22 | stocks, bonds, and commodities | finance and investment |
| 5 | 22 | points | stocks, bonds, and commodities |
| 6 | 21 | yields | banking |
| 7 | 17 | bills | bills |
| 8 | 12 | federal funds rates | banking |
| 9 | 11 | reductions | banking |
| 10 | 10 | rates | banking |

TABLE 1-continued

| | | Overall Theme Capacity 79,902 | |
|---|---|---|---|
| # | Theme Strength | Theme Terms | Theme Concept |
| 11 | 9 | discount equivalent rates | commerce and trade |
| 12 | 9 | three-month | three-month |
| 13 | 8 | 1-year | 1-year |
| 14 | 8 | rates | commerce and trade |
| 15 | 7 | discounts | commerce and trade |
| 16 | 7 | equivalents | equivalencies |

Figure 7A:
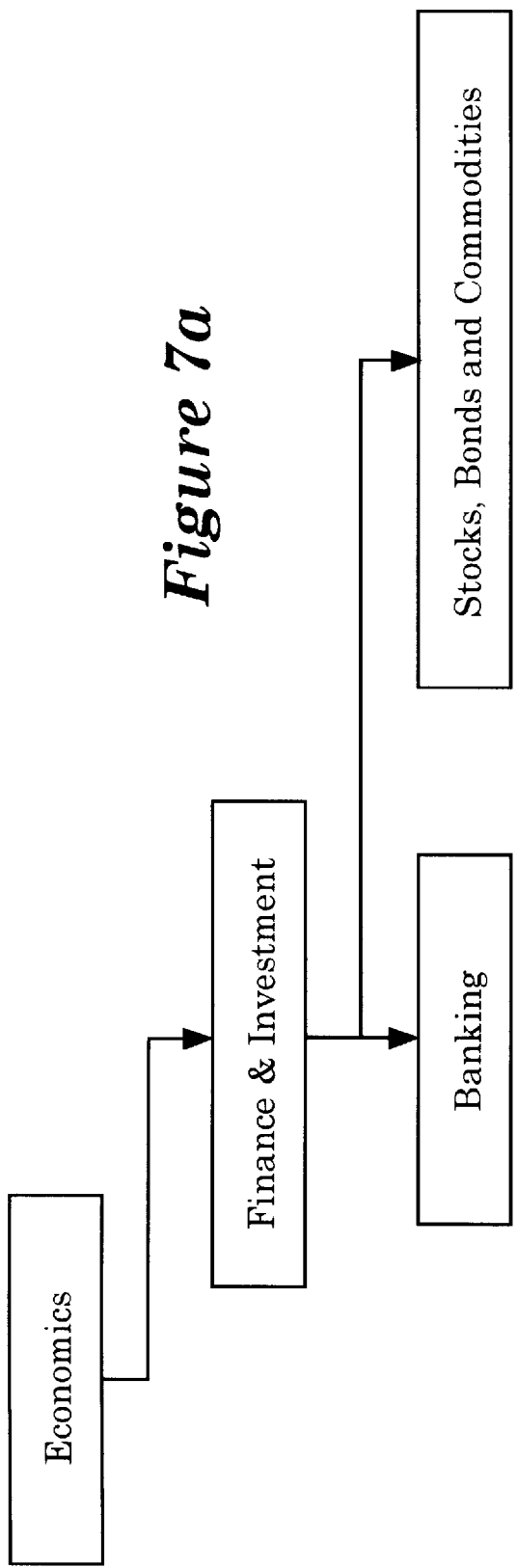
FIG. 7a illustrates a portion of a world view ontology for economics.
Figure 7B:
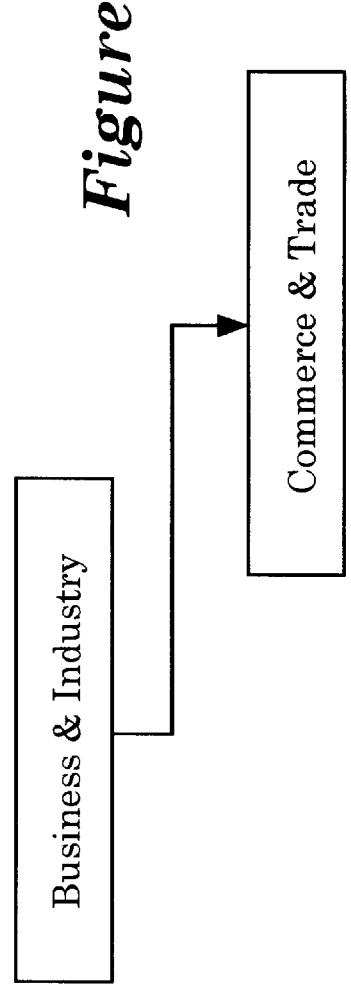
FIG. 7b illustrates a portion of a world view ontology for business and industry.

Based on the theme strength, the theme terms are listed in the order of importance or strength in the paragraph. Note that the term "banking" does not appear in the paragraph. However, because banking is a theme concept for several of the theme terms, the concept of "banking" is listed as a theme term itself. Based on the knowledge catalog 100, "banking" is conceptualized to "finance and investment" as shown in Table 1. FIG. 7a illustrates a portion of an ontology for "economics", and FIG. 7b illustrates a portion of an ontology for "business and industry." For this example, the theme vector processor 250 maps the theme terms to the above ontologies. This example illustrates the fact that a theme vector output may contain words that are not in the original input discourse. For example, the theme term "basis points" is conceptualized by the theme vector processor 250 to "stocks, bonds, and commodities." The term "stocks, bonds, and commodities" does not appear in the original input example. The theme vector processor 250 also determines that the theme concept "stocks, bonds, and commodities" is developed significantly enough to be designated as the fourth most important theme for the paragraph.

The theme vector processing of the present invention has application for use in document classification. In general, the theme vector processing of the present invention permits classification of documents according to the concepts in the document. For example, the theme vector processing determines the top one or two general concepts that best represent the content of each document. Consequently, the general concept information may be utilized to categorize the documents into one or more groups. For example, utilizing the theme vector output 730 (FIG. 6), a classification application may extract the concepts for the top one or two non ambiguous themes, then classify the document according to these concepts. For example, the theme vector processor 250 may determine that one of the top themes for a document is "Federal Fund Rates", a non ambiguous term, that is assigned the theme concept of banking for the economics ontology. For this example, the document may be classified under "banking."

If a theme concept becomes a theme term in the theme vector output, the higher level category from the corresponding ontology is returned as a theme concept. For example, the concept of "banking" is categorized under "finance and investment." If "banking" is a theme concept in the theme vector output, but is also promoted to a theme concept in the theme vector output, then "finance and investment" is returned as the theme concept in the theme vector output.

Figure 8:
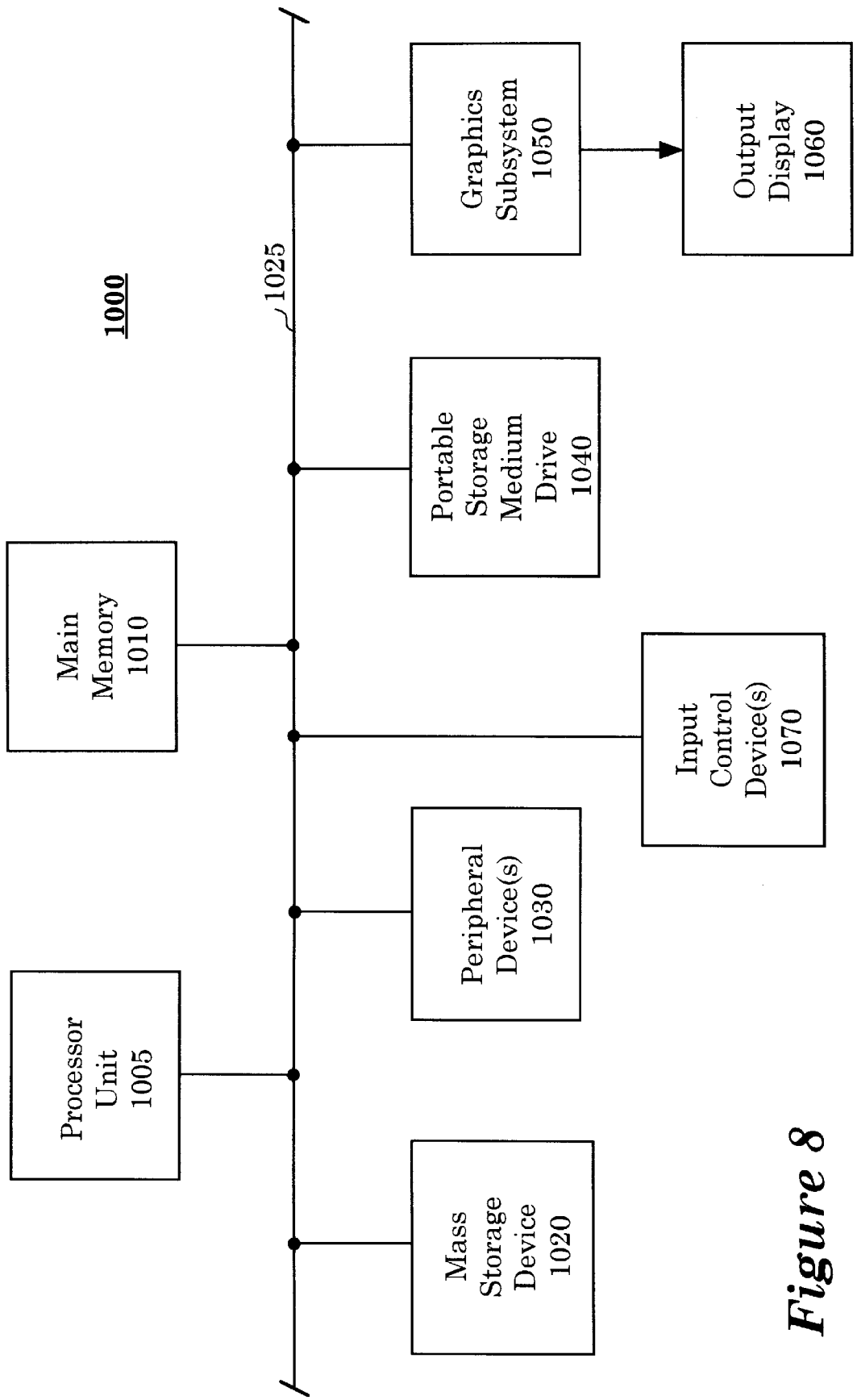
FIG. 8 illustrates a high level block diagram of a general purpose computer system in which the content processing system of the present invention may be implemented.

FIG. 8 illustrates a high level block diagram of a general purpose computer system in which the content processing system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the content processing system of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 8 as being connected via the bus 1025. However, the computer system 1025 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may implemented with a magnetic disk drive or an optical disk drive, is a non-volatile storage device for storing data and instructions for use by the processor unit 1005. In one embodiment, the mass storage device 1020 stores the content processing system software embodiment for loading to the main memory 1010.

The portable storage medium drive 1040 operates in conjunction with a portable non-volatile storage medium, such as a floppy disk or a compact disc read only memory (CD-ROM), to input and output encoded data and code to and from the computer system 1000. In one embodiment, the content processing system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the input discourse may be input to the computer system 1000 via a portable storage medium or a network for processing by the content processing system.

The input control device(s) 1070 provide a portion of the user interface for a user of the computer system 1000. The input control device(s) 1070 may include an alphanumeric keypad for inputting alphanumeric and other key information, and a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for determining theme in an input discourse, said method comprising the steps of:

receiving a plurality of themes from said input discourse;

storing a plurality of categories in a knowledge catalog arranged hierarchically to reflect semantic or linguistic relationships among said categories in said knowledge catalog;

classifying said themes of said input discourse by relating said themes into categories of said knowledge catalog, wherein classification of said themes in categories of said knowledge catalog reflects semantic or linguistic relationships between said themes;

generating a theme concept for said themes by extracting a category from a higher level in said knowledge catalog; and adding a theme concept as a theme if more than one theme map to said theme concept.

2. The method as set forth in claim 1, further comprising the steps of:

determining whether each theme term is essentially non-ambiguous such that said theme term is commonly recognized as having a single sense; and classifying only non-ambiguous terms in said knowledge catalog.

3. A computer readable medium comprising a set of instructions stored therein, which when executed by a computer, causes the computer to perform the steps of:

receiving a plurality of themes from said input discourse;

storing a plurality of categories in a knowledge catalog arranged hierarchically to reflect semantic or linguistic relationships among said categories in said knowledge catalog;

classifying said themes of said input discourse by relating said themes into categories of said knowledge catalog, wherein classification of said themes in categories of said knowledge catalog reflects semantic or linguistic relationships between said themes;

generating a theme concept for said themes by extracting a category from a higher level in said knowledge catalog; and adding a theme concept as a theme if more than one theme map to said theme concept.

4. The computer readable medium as set forth in claim 3, further comprising instructions for:

determining whether each theme term is essentially non-ambiguous such that said theme term is commonly recognized as having a single sense; and classifying only non-ambiguous terms in said knowledge catalog.

* * * * *